April 28, 1970     D. H. HILL     3,508,996
PRESSURE VESSEL FOR LAMINATING OPERATIONS
Original Filed April 25, 1963     3 Sheets-Sheet 2
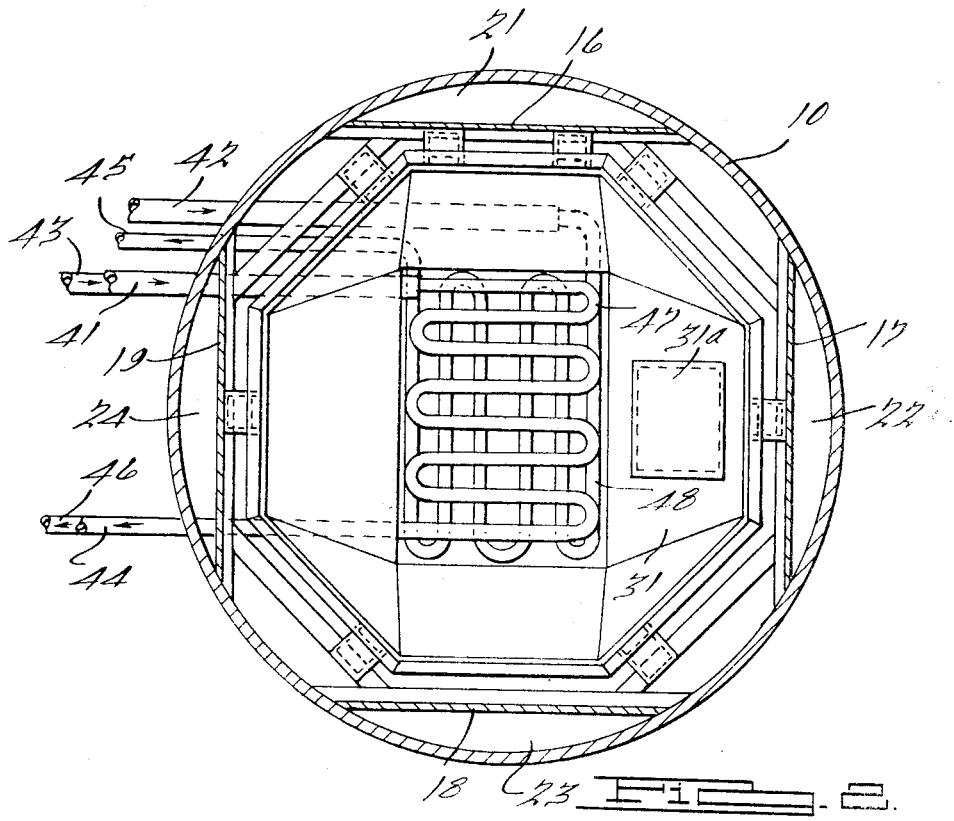
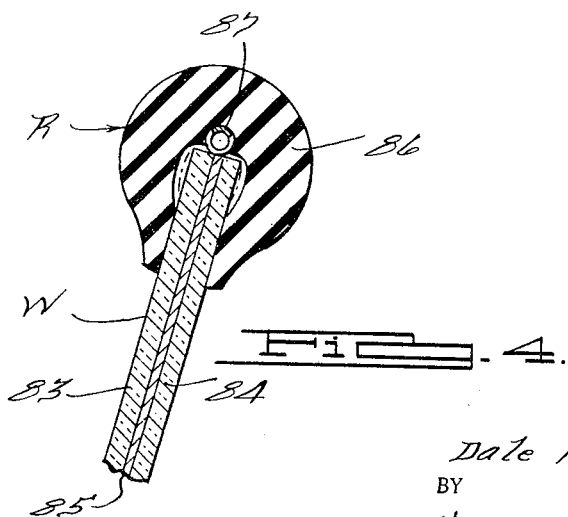
INVENTOR.
Dale H. Hill
BY
Harness & Harris
ATTORNEYS

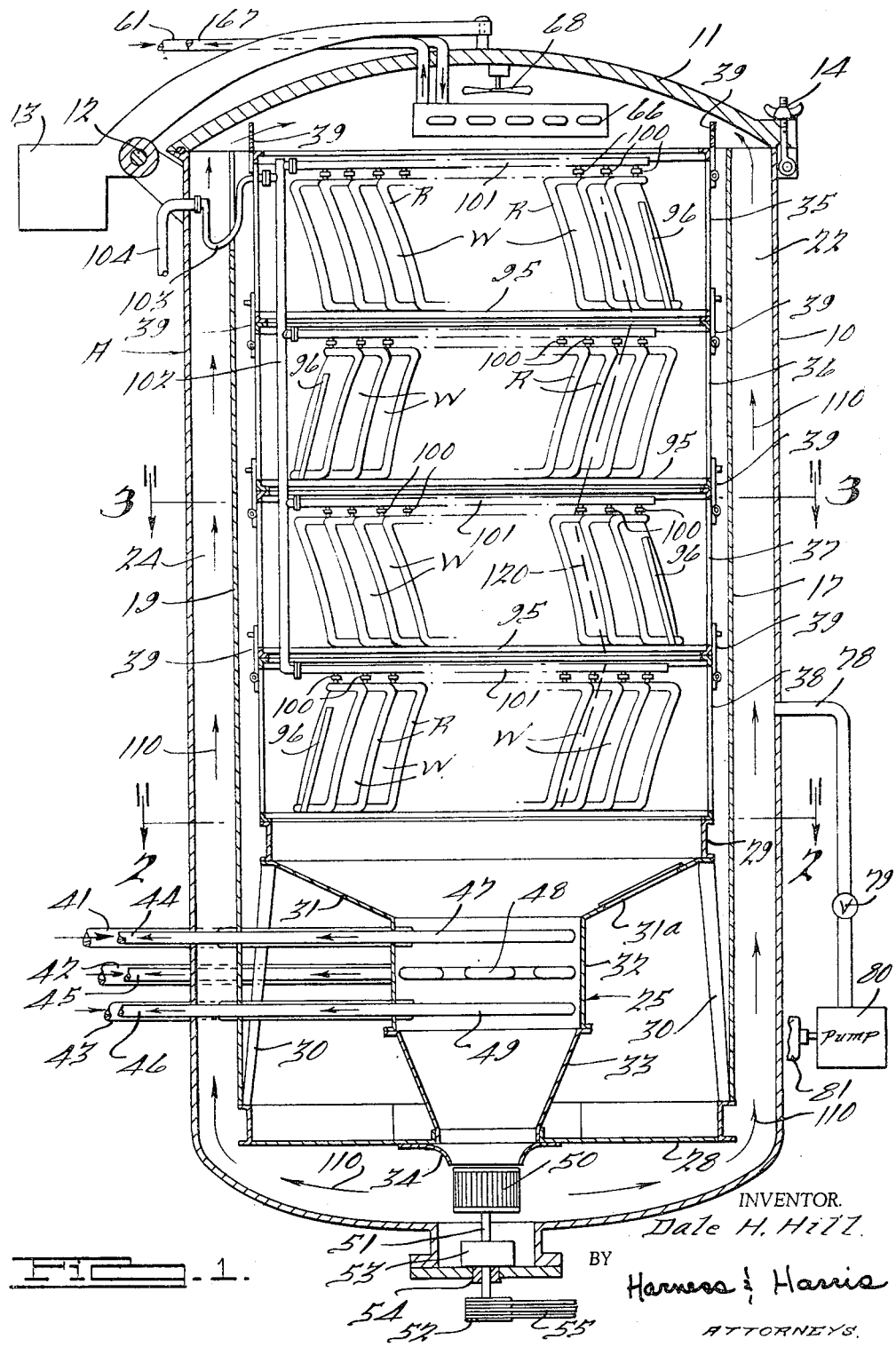

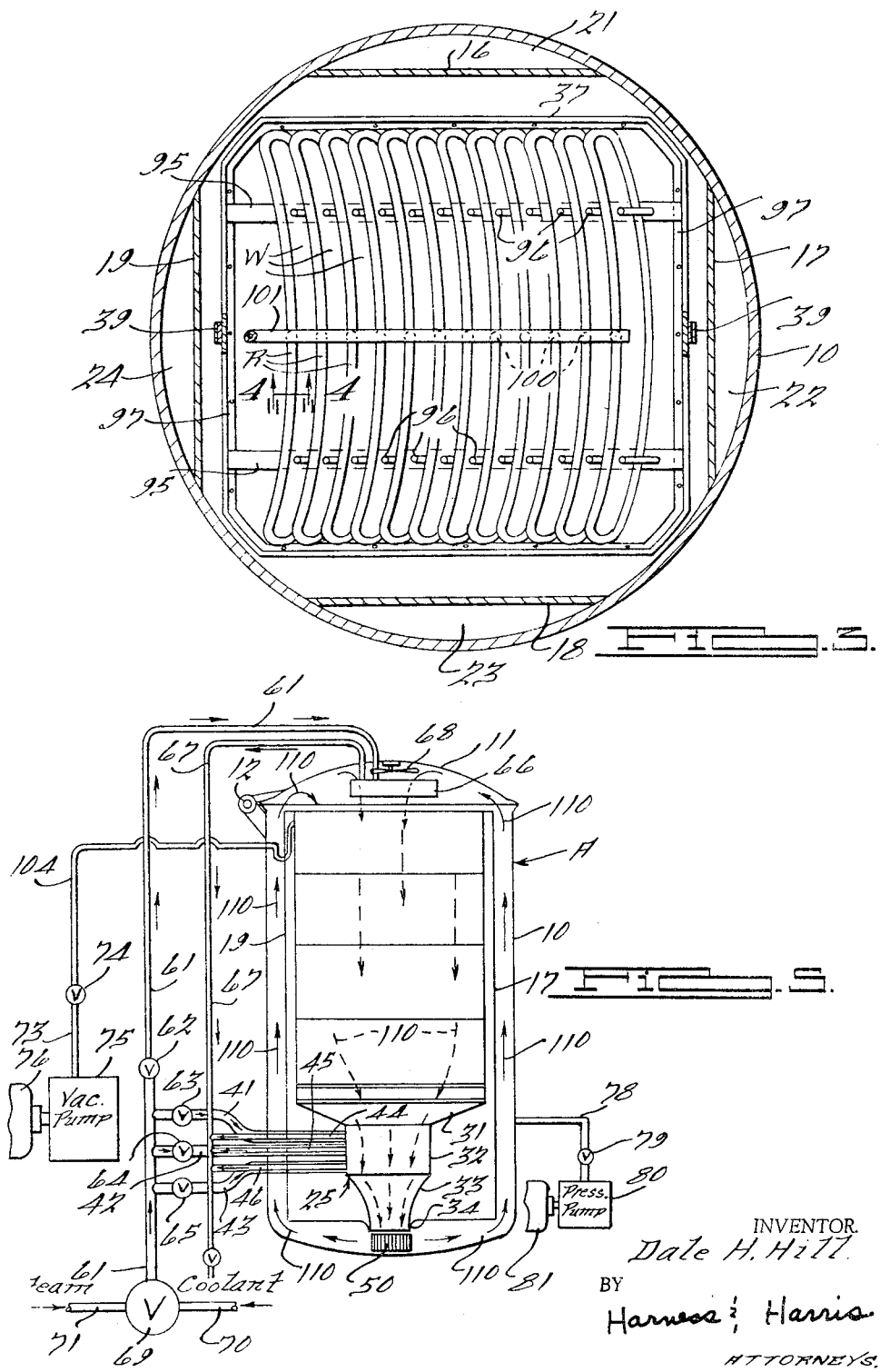

United States Patent Office

3,508,996
Patented Apr. 28, 1970

3,508,996
PRESSURE VESSEL FOR LAMINATING OPERATIONS
Dale H. Hill, Farmington, Mich., assignor to Chrysler Corporation, Highland Park, Mich., a corporation of Delaware
Original application Apr. 25, 1963, Ser. No. 275,610, now Patent No. 3,347,723, dated Oct. 17, 1967. Divided and this application June 22, 1967, Ser. No. 662,224
Int. Cl. B32b 31/00
U.S. Cl. 156—382            8 Claims

ABSTRACT OF THE DISCLOSURE

Autoclave apparatus for effecting lamination of glass sheet assemblies. The apparatus is composed of a tank structure capable of being internally temperature controlled and of supporting laminate assembly racks. The tank structure and racks are provided with cooperating piping whereby a vacuum can be maintained about the periphery of each assembly independent of the internal tank pressure.

---

This invention is a division of application Ser. No. 275,610, filed Apr. 25, 1963, Patent No. 3,347,723, Oct. 17, 1967 and relates to apparatus for producing a glass assembly through the bonding of a thermoplastic interlayer with two matched sheets of glass.

It is a primary object of this invention to provide improved apparatus which will facilitate the use of a fast, economical and improved type of lamination process.

More specifically, it is an object of this invention to provide an improved autoclave unit for the lamination of glass sheets or similar material.

Other objects and advantages of this invention will become readily apparent from a reading of the following description and a consideration of the related drawing, wherein:

FIGURE 1 is a sectional elevational view of an autoclave unit embodying this invention;

FIGURE 2 is a sectional elevational view taken along the line of and looking in the direction of the arrows 2—2 of FIGURE 1;

FIGURE 3 is a sectional elevational view taken along the line of and looking in the direction of the arrows 3—3 of FIGURE 1;

FIGURE 4 is a fragmentary sectional elevational view taken along the line of and looking in the direction of the arrows 4—4 of FIGURE 3; and FIGURE 5 is a diagrammatic side elevational view of the autoclave apparatus and its associated equipment that is utilized in carrying out the process embodying this invention.

As clearly shown in FIGURE 1, this autoclave apparatus involves a cylindrical tank-type autoclave unit A that has a pivoted top 11 supported by the cylindrical tank member 10. Top 11 is hinged to tank 10 as shown at 12 and the top is counterbalanced by the counterweight mechanism 13. Suitable bolt connector means 14 are utilized between the periphery of the hinged top 11 and the tank portion 10 to sealingly lock the top member 11 to the top of the tank member 10 during the several stages of the process to be hereinafter described. It will be noted from FIGURES 1–3 that the cylindrical tank 10 has interiorly disposed, chordal arranged, vertically extending partitions 16, 17, 18 and 19 that provide four vertically extending conduit chambers 21, 22, 23 and 24, respectively. These conduit chambers 21 through 24 are to facilitate the circulation of air and/or gas throughout the autoclave unit during the various stages of the laminating process as will be described hereafter.

Mounted in the lower end of the tank 10 is a base framework composed of a horizontally disposed bottom frame 28 and a horizontally disposed upper frame 29 that are interconnected by substantially vertically extending leg members 30. Extending between and mounted within the upper frame 29 and the lower frame 28 is a funnel-shaped conduit 25 that has a series of fluid circulating coils 47, 48 and 49 mounted in its center section 32. The upper section 31 of the funnel-shaped conduit 25 is provided with a trap door 31a for service purposes. The lower section 33 of the funnel-shaped conduit 25 terminates in an outlet 34 that provides the discharge into a centrifugal fan 50. Fan 50 is connected to a fan shaft 51 that mounts a pulley member 52 that is drivingly connected by means of belts 55 to a suitable motor driven pulley not shown. Drive shaft 51 is encircled by a seal 53, preferably of the pressure responsive type. A suitable shaft bearing 54 journals the drive shaft 51.

As previously mentioned, located in the middle section 32 of the funnel-shaped conduit 25 at the lower end of the autoclave tank 10, are three heat transfer coil units 47, 48 and 49, respectively. Each of these coil units has an inlet pipe and an outlet pipe so that heating and/or cooling fluids of various types may be circulated through each of the coil units 47, 48 and 49. In the instance shown, the coil 47 has inlet pipe 41 and outlet pipe 44. The coil unit 48 has inlet pipe 42 and outlet pipe 45. The coil unit 49 has inlet pipe 43 and outlet pipe 46. Each of these several inlet and outlet pipes for the several coil units 47, 48, 49 are connected through suitable control valving to supply and discharge conduits or manifolds as will be described hereafter.

As can be observed from FIGURE 5, the supply riser 61 is connected to a main valve controlled manifold 69 that is adapted to receive either hot steam from the supply pipe 71 or some type of refrigerant or coolant from the supply pipe 70. Either of these fluids, namely a heating fluid or a cooling fluid, may be introduced into supply riser 61 through the manifold valve 69. Likewise, the fluid supplied through the riser 61 can be selectively introduced into the several coils 47, 48 and 49 by means of the valves 63, 64, 65. The coil supply and dscharge risers 61 and 67 are also connected to the inlet and outlet respectively of the coil unit 66 that is mounted for the underside of the autoclave pivoted head 11. A fan unit 68 is positioned adjacent the coil 66 to facilitate heat transfer.

Connected to the interior of the autoclave tank 10 is a conduit 78 such that compressed air or a similar pressurizing fluid medium may be introduced into the tank interior to facilitate the laminating process. In the instance shown, the conduit 78 is connected through the tank sidewall 10 (see FIGURE 5) and this conduit is controlled by a valve 79. Conduit 78 is connected through valve 79 to a suitable pressure pump 80 that is adapted to be driven by a motor means 81.

To initiate a laminating process according to this invention the first step is to assemble the materials to be laminated 83, 84 and 85 (see FIGURE 4) into laminating sandwich assemblies W. After assembling the laminate sandwich assemblies, a desiring ring R, which is an endless resilient ring, is applied around the entire periphery of each of the laminate assemblies W. The rings R are completely described in Harvey J. Little United States Patents Nos. 3,074,466 and 3,074,838. Thereafter groups of these laminate assemblies W with the deairing ring R applied thereto are stacked in the baskets 35, 36, 37 and 38 as shown in FIGURES 1 and 3. From FIGURE 1 it will be noted that the windshield laminate assemblies W with the deairing rings R mounted thereon are arranged in the stacked baskets 35–38 such that the windshield assemblies W in successive baskets are tilted in opposite directions. This facilitates a scrubbing action of the autoclave gases or fluids that are circulated across the windshield assemblies W during the laminating operation. After mounting the ring encircled laminate assemblies W in the baskets 35-38 then the coupling 100 of each ring R is connected to the header pipe 101 on each basket. Each basket header pipe 101 is connected to a riser piper 102 when the several baskets 35-38 are stacked in the autoclave tank 10. After the several baskets of windshield assemblies W with the deairing rings R applied thereto have been arranged in the autoclave unit A as shown in FIGURE 1, then the various header pipes 101 are connected to the riser pipe 102. Riser 102 is continuously connected by conduit 103 to the evacuation conduit 104. Evacuation conduit 104 is connected through valve means 74 and conduit 73 to the suction pump 75. Pump 75 is driven by motor 76.

After the windshield assemblies W are mounted in the autoclave A as shown in FIGURE 1, the tank cover 11 is closed and sealingly latched in place by means of the latch bolts 14. The first stage of the continuous laminating operation is then ready to begin. At this time the evacuation pump 75 is brought into operation and an evacuation pressure of approximately 20 to 30 inches of mercury is established within the various deairing rings R that surround the laminate assemblies W. At the same time that the laminate assemblies are being deaired by the evacuation rings R, heat in the form of steam or some other fluid medium is introduced into the several coil elements 47, 48 and 49 at the lower end of the autoclave unit A and heat may also be introduced at this time into the upper coil elements 66 or the underside of the tank lid 11. Along with the introduction of heat in the coil units and suction in the evacuating rings R, there is also a bonding pressure developed within the autoclave unit A. The bonding pressure is accomplished by means of a pressure pump 80 that is connected to the interior of the tank 10 by means of the conduit 78 and valve 79. During this first stage of the laminating operation, if the laminate assembly W is formed of glass sheets 83, 84 with a polyvinyl butyral interlayer 85, a pressure of approximately 50 to 100 pounds per square inch is established within the autoclave unit A by means of the pressure pump 80. The heating medium introduced through the several coil elements 47, 48, 49 and 66 is such as to establish a temperature within the autoclave unit A of somewhere in the range of between 225° F. to 265° F. during the first stage of the laminating operation. With an evacuation pressure of 20 to 30 inches of mercury, a pressure of 50 to 100 pounds per square inch, and a temperature of 225° F. to 265° F., it has been found that in the first stage a pretacking or prepressing of the laminate assemblies can be accomplished within a relatively short period of time, that is within thirty minutes. While the temperature and pressure values given for this first stage of the laminating operation, that is called the prepress or pretack stage, have been found to establish a satisfactory prepress, it is not to be considered that the ranges indicated are the only ranges that will work. Changes in materials for the interlayer and outside sheets will undoubtedly require changes in the times, pressures and temperatures used in the laminating operation.

The second stage of laminating or the final laminating stage is accomplished without removing the laminate assemblies W from the autoclave A. The second stage is achieved in the following manner. First there is a termination of evacuation through the deairing rings R by connecting the evacuation conduit 104 to atmosphere through operation of the valve 74. At the same time that evacuation through the deairing rings is terminated, the pressure head within the autoclave unit is increased to approximately 250 to 300 pounds per square inch. This is accomplished by suitable control of the motor driven pump 80. Along with increase in the pressure head within the autoclave unit A there is an increase in the temperature within the autoclave unit A to a higher range of between 250° F. to 350° F. With a pressure of approximately 250 pounds per square inch and a temperature of approximately 250° F. to 300° F., the second or bonding stage of the lamination process can be accomplished within thirty-five minutes or less.

On completion of the second stage of the laminating process, the heated fluid supplied to the various coil units 47, 48, 49 and 66 is shut off by way of manifold valve 69. Thereafter to facilitate cooling of the laminated assemblies W in the shortest possible time a coolant fluid may be introduced to the coils 47, 48, 49 and 66 by way of supply conduit 70, the manifold valve 69, and the supply riser pipe 61. This coolant fluid is then circulated through the various coil units 47, 48, 49 and 66 so as to provide a fast but a controlled cooling within the autoclave unit A. Controlled cooling will prevent thermal shock that might cause glass cracking due to thermal stresses. The cooling of the laminate assemblies also facilities their immediate handling when the baskets 35-38 are subsequently removed from the autoclave unit A. It is believed that within twenty-five minutes the temperature of the bonded laminate assemblies W can be dropped to less than 150° F. when the cooling stage disclosed is utilized.

When the third or cooling stage of this process is initiated the pressure within the autoclave tank is relieved by suitable control of the pressure pump 80 and the associated valve 79. The reason the pressure is reduced within the tank A during the cooling stage is that the heat transfer fluid, that is the air or gas circulated within the tank by fans 50 and/or 68, is higher at the reduced pressure and thus it can be circulated faster. As a result of faster circulation of the heat transfer medium it is possible to achieve a faster cooling of the previously heated laminate assemblies. The evacuation or deairing rings R remain inactive during the cooling stage as was the case during the second stage bonding or laminating stage. Obviously, if the laminate assemblies have been completely bonded during the second stage then there is no possible need for any deairing during the cooling stage because the glass sheets 83, 84 have already been bonded to the interlayer 85 through the area of the laminate assembly W.

It is thought to be obvious from what has been set forth with respect to the several stages of this multistage laminating process that the circulating fans 50 and/or 68 for the heat transfer medium operate during all stages of the laminating process. While these fans can be constant speed units, still, it is possible to improve control of the laminating process by using variable speed fans that have thermostatic speed controls associated therewith. In this manner temperature sensors within the tank A can signal the interior temperatures to the fan speed controls and the fans can operate more effectively to maintain the desired temperatures during the various stages of the laminating process.

One of the important conditions that must be maintained during a laminating operation to achieve maximum yield is that there be a uniform temperature and pressure throughout the autoclave interior during any stage of the laminating process. This particular autoclave unit A is designed to accomplish fast heat transfer and uniform interior temperatures and pressures at all times by virtue of novel means for circulation of the air or gas within the autoclave unit during all stages of the laminating operation. The circulation of the heat transfer gas or fluid within the autoclave unit A is accomplished by means of a novel arrangement of interior partitions, fans, heat transfer coils, chambers, baffles, ducting and controls that cooperate to accomplish the best possible laminating process in a minimum of time and with the minimum expense and operator supervision.

It will be noted from FIGURES 1 and 5 that the centrifugal fan 50 draws the air or other heat transfer medium within the autoclave unit A downwardly through the lower end or outlet 34 of the funnel-shaped ducts 25. Air or gas drawn through duct 25 by fan 50 is discharged radially outwardly so that it tends to follow the path of the arrows 110. The fluid flow path for the heat transfer fluid is relatively well defined by the several vertical chambers 21, 22, 23 and 24 which carry the circulating heat transfer fluid from the lower end of the autoclave unit tank 10 upwardly along the tank side wall and discharges it across the top of basket 35 within the autoclave unit. The fluid flow from the top end of tank 10 will be downwardly through the several stacked baskets of laminate assemblies W from where it will be discharged through the duct section 31 to the coil section 32 and then to the outlet section 33 and back into the fan 50.

While the supplemental heat transfer coil 66 and associated fan 68 that are mounted on the underside of the autoclave lid 11 can be omitted without materially interfering with the operation of the described two-stage laminating process, still, the units 66 and 68 insure maximum and uniform heat transfer within the autoclave unit A and therefore these units 66, 68 form a part of the preferred embodiment of this invention.

Another arrangement of structure that is disclosed in FIGURE 1 and that contributes to the improved heat transfer achieved with this autoclave unit, is the specific arrangement of the windshield laminate assemblies W within the stacked baskets 35-38. By tilting the assemblies W in adjacent stacked baskets in opposite directions, it is possible to give the heat transfer fluid or gas circulated through the autoclave baskets a zig-zag path as indicated by the broken line 120 in FIGURE 1. This zigzag path for the heat transfer fluid gives a scrubbing action to the fluid and accomplishes maximum heat transfer in minimum time.

From FIGURES 1 and 3 it will be noted that the baskets 35-38 that support the laminate assemblies W during the laminating process are substantially open frames of octagonal plan configuration. These baskets 35-38 have a pair of spaced bottom support bars 95 that are carried by an open peripheral frame 97. The bottom support bars mount rockable spacer bars 96 that keep the assemblies W spaced so that the heat transfer fluid passed vertically through baskets can pass freely across opposite sides of the assemblies W.

While laminating has occasionally been accomplished in a steam or "dry" autoclave as opposed to the "wet" or oil autoclave, still, the complete process has most frequently involved a multistep rather than a continuous process. The first step usually involved a prepress or tacking step using nipper rolls or the like, or some type of bagging operation carried on in a pressure chamber. Thereafter the individual prepressed laminate assemblies were then transferred to an autoclave unit for the second and final step of completing and curing the bond between the interlayer and the spaced outside sheets. Most frequently some type of handling of the laminate assemblies was required after the prepress step and before the final cure step. Also, the fact that the assemblies had to be cooled after the completion of the bonding step required additional time in the final stage autoclave that elongated the period of the laminating cycle. Each of the noted disadvantages of prior known laminating procedures for glass or similar materials has been eliminated by the continuous multistage process that has been described. In this process and with the disclosed apparatus it is possible to eliminate all individual handling of the laminate assemblies from the time the assemblies are first prepared for prepressing until completion of the laminating cycle and the cooling step. Not only is the disclosed process a continuous process that eliminates handling of the laminate assemblies during the process but the same equipment is used for prepressing final bonding and curing and for cooling. In addition, the heat transfer coils 47-49 and 66 serve dual functions and materially reduce the cycle time for the process. Also, the autoclave apparatus with its novel circulation system for the air or gas, or other fluid that is used as the heat transfer medium, insures a uniform temperature throughout all parts of the autoclave tank and thus all laminate assemblies will be treated in the identical manner so that the yield of the process will be at maximum.

I claim:

1. Apparatus for effecting the lamination of a plurality of assemblies each composed of a pair of matched glass sheets and a thermoplastic interlayer comprising a closed air filled container having a removable cover, a plurality of vertically stacked, open, laminate assembly baskets removably supported within said container, each basket having a conduit means thereon connectible to an evacuation source located within said container and to an evacuation ring that encloses the periphery of each laminate assembly, an air pressurizing source connected to the interior of said container, heat transfer means mounted in said container in vertical alignment with said stacked baskets for controlling the temperature of the air within the container, fan means to circulate the air within the container through the baskets and across the laminate assemblies therein, and partition means within the container to provide air circulation ducting within said container to cooperate with said fan means for control of the flow of said air, said partition means extending vertically to define a center chamber in which said laminate assembly baskets are supported and in which said air flow is substantially unidirectional with respect to the longitudinal axis of the container and said heat transfer means in the container being selectively connectible to both a heating and a cooling source and being mounted immediately adjacent to and in the air flow path created by said fan means.

2. Apparatus for effecting the lamination of a plurality of assemblies each composed of a pair of matched glass sheets and a thermoplastic interlayer comprising a cuplike, cylindrical container having a removable cover, a plurality of vertically stacked, open, laminate assembly racks removably supported within said container, each rack having a conduit means thereon connectible to an evacuation source located within said container and to an evacuation ring that encloses the periphery of each laminate assembly mounted in the rack, a pressurizing source connected to the interior of said container, heat transfer means mounted in said container beneath and in vertical alignment with said stacked racks for controlling the temperature of the fluid medium within the container, fan means in said container in vertical alignment with said stacked racks to circulate the fluid medium within the container from the heat transfer means through the racks and across the laminate assemblies therein, and vertically extending, chordally positioned, partition means within the container to provide fluid medium circulation ducting within said container to cooperate with said fan means for control of the flow of said fluid medium within said container.

3. In an apparatus as set forth in claim 2 wherein said heat transfer means comprises a plurality of coil units that may be selectively connected to heating and cooling means.

4. In an apparatus as set forth in claim 2 wherein heat transfer means are arranged at the upper and lower ends of the vertically stacked racks.

5. Apparatus for effecting the lamination of one or more assemblies each composed of a pair of matched glass sheets and a thermoplastic interlayer comprising a closed, air filled, container having a removable cover, a laminate assembly rack removably supported within said container, said rack having a conduit means thereon connectible to an evacuation source located within said container and to an evacuation ring that encloses the periphery of each laminate assembly mounted in the rack, an air pressurizing source connected to the interior of said container, heat transfer means mounted in said container for controlling the temperature of the air within the container, said heat transfer means being operable to selectively heat and cool the container air, fan means within the container to circulate the container air across the heat transfer means, through the rack and across the laminate assembly or assemblies therein, and vertically extending, chordally position ducting means within the container to provide controlled air circulation through the heat transfer means and across the laminate assemblies by said fan means.

6. Apparatus for effecting the lamination of a plurality of assemblies each composed of a pair of matched glass sheets and a thermoplastic interlayer comprising a cup-like, air filled, cylindrical container having a removable cover, a plurality of vertically stacked, open, laminate assembly racks removably supported within said container, each rack having a conduit means thereon detachably connectible to an evacuation source located within said container and to an evacuation ring that encloses the periphery of each laminate assembly mounted in the rack, an air pressurizing source connected to the interior of said container, coil-type heat transfer means mounted in said container in vertical alignment with said stacked racks for controlling the temperature of the air within the container, fan means in said container in vertical alignment with said stacked racks to circulate the air within the container from the heat transfer means through the racks and across the laminate assemblies therein, and vertically extending, chordally positioned, partition means within the container to provide air circulation ducting within said container to cooperate with said fan means to receive air from one end of the stacked racks and to recirculate it for introduction at the other end of the stacked racks.

7. In an apparatus as set forth in claim 6 wherein said heat transfer means comprises a plurality of coil units with valve means so that individual coils may be selectively connected to heating and cooling fluid supply means.

8. In an apparatus as set forth in claim 6 wherein at least a portion of the heat transfer means is located in a funnel-shaped shroud beneath the stacked racks that converges to a discharge opening aligned with the intake to an air circulation fan means.

References Cited
UNITED STATES PATENTS

| | | | |
|---|---|---|---|
| 1,732,022 | 10/1929 | Lytle | 156—382 |
| 1,909,444 | 5/1933 | Worrall | 156—382 |
| 1,960,580 | 5/1934 | Fraser | 156—382 |
| 2,992,953 | 7/1961 | Talburtt | 156—382 |

SAMUEL FEINBERG, Primary Examiner